United States Patent

Mowry et al.

[11] Patent Number: 5,524,128
[45] Date of Patent: Jun. 4, 1996

[54] BOILING WATER REACTOR STABILITY CONTROL

[75] Inventors: Christofer N. Mowry, Roswell, Ga.; Israel Nir, Jackson, Miss.

[73] Assignees: Entergy Operations, Inc., Jackson, Miss.; PECO Energy Company, Philadelphia, Pa.

[21] Appl. No.: 153,534

[22] Filed: Nov. 17, 1993

[51] Int. Cl.$^6$ ............................................. G21C 7/06
[52] U.S. Cl. .................. 376/236; 376/371; 376/352; 376/216; 376/210; 376/439
[58] Field of Search ................... 376/236, 371, 376/439, 352, 216, 246, 241, 210; 976/DIG. 60; 73/196

[56] References Cited

U.S. PATENT DOCUMENTS

| | | | |
|---|---|---|---|
| 3,565,760 | 2/1971 | Parkos et al. | 376/236 |
| 3,998,693 | 12/1976 | Musick | 376/207 |
| 4,009,614 | 3/1977 | Sheppard et al. | 73/195 |
| 4,400,343 | 8/1983 | Izumi et al. | 376/417 |
| 4,605,530 | 8/1986 | Tatemichi | 376/237 |
| 4,879,087 | 11/1989 | Akiyama et al. | 376/216 |
| 4,912,732 | 3/1990 | Singh | 376/211 |
| 4,947,485 | 8/1990 | Oosterkamp | 376/210 |
| 5,112,570 | 5/1992 | Dix et al. | 376/370 |
| 5,158,738 | 10/1992 | Trouble et al. | 376/217 |
| 5,171,516 | 12/1992 | Iwamoto | 376/216 |
| 5,174,946 | 12/1992 | Watford et al. | |
| 5,229,068 | 7/1993 | Johansson | 376/371 |
| 5,271,044 | 12/1993 | Hidaka et al. | 376/214 |

Primary Examiner—Donald P. Walsh
Assistant Examiner—Meena Chelliah
Attorney, Agent, or Firm—Robert C. Podwil; Reed Smith Shaw & McClay

[57] ABSTRACT

A control system for avoiding coupled neutronic-thermal hydraulic instabilities during maneuvering of a boiling water nuclear reactor that determines the average elevation in the reactor core of the coolant boiling boundary, and avoids instabilities by maintaining the core average coolant boiling boundary elevation above a target value, which is dependent on reactor design specifics but may be about four feet, in core power-flow operating regions which are subject to instabilities. The system may be implemented without physical modification of existing reactors or reactor instrumentation and control systems through use of the reactor core monitoring computer, which typically has available all core parameters necessary for the computations required in the invention. In a preferred embodiment, the control system is implemented by calculating the ratio of core power generated below the target elevation to the core power required for coolant saturation, and controlling the reactor so that the ratio is less than one.

18 Claims, 9 Drawing Sheets

CHANNELS → CORE

BULK SATURATION ELEVATION

```
CONTROL ROD INSERTION FRACTIONS

——   ——   ——   ——   ——   ——   ——   ——
——   ——   ——   ——   0.38  ——  0.75  ——
——   ——   ——   ——   ——   ——   ——   ——
——  0.83  ——  1.00  ——  1.00  ——
——   ——   ——   ——   ——   ——   ——   ——
——   ——  0.52  ——  0.92  ——  0.62  ——
——   ——   ——   ——   ——   ——   ——   ——
0.75 ——  0.92  ——  0.62  ——  0.92  ——

—— = FULL OUT
```

BOILING WATER REACTOR STABILITY CONTROL

FIELD OF THE INVENTION

This invention relates to control of boiling water type nuclear reactors. More particularly, this invention relates to a system for maintaining stable reactor operations during reactor maneuvering to avoid coupled neutronic-thermal hydraulic instabilities.

BACKGROUND OF THE INVENTION

Under certain conditions, Boiling Water Reactors (BWRs) are susceptible to coupled neutronic-thermal hydraulic instabilities. Such instabilities, which are characterized by periodic core power and hydraulic oscillations, can compromise established fuel safety limits. Industry events and analytical studies during the past several years have revealed that, in general, existing neutron monitoring features of the reactor protection system do not assure automatic protection against this class of events.

Various organizations within the United States nuclear industry are actively pursuing permanent solutions to this problem that, in accordance with regulations governing the general design criteria for nuclear power plants, will automatically "assure that power oscillations which can result in conditions exceeding specified acceptable fuel design limits are not possible or can be reliably detected and suppressed." Development of these solutions is progressing, and modifications to reactor protection systems may occur within several years. One proposed solution is to provide instrumentation which can detect oscillations after they have commenced, and take appropriate control measures necessary to suppress them. An example of a system for doing so is shown in U.S. Pat. No. 5,174,946. However, implementing such a solution requires substantial modification to existing reactor instrumentation and control systems.

Implementation of effective operational strategies, utilizing existing plant capabilities in the near-term and supplementing the permanent solutions, is critical for mitigation of the reactor instability phenomenon.

SUMMARY OF THE INVENTION

It is therefore a general subject of the invention to provide a BWR core stability control system for maintaining stable reactor operations and avoiding coupled neutronic-thermal hydraulic instabilities during controlled reactor maneuvering.

It is another object of the invention to provide such a system which can be implemented using existing reactor instrumentation and control systems and without modification of the reactor.

It is another object of the invention to provide such a system which does not require measurement of all variables which may be involved in core instability.

In accordance with these objects, a simple, effective, control—limiting the core average bulk coolant saturation elevation above a predetermined axial plane—has been developed that provides the means to reliably influence the stability of a reactor. The stability control of the invention lends itself to use by operators during reactor maneuvering. By separating the instability phenomenon into fundamental constituent parts, consistent and direct control can be achieved. The control is designed for use during the quasi-steady-state conditions of controlled reactor maneuvering. Uncontrolled loss of stability margin resulting from transients is not generally amenable to operational response except by scram. This control, its phenomenological basis, sensitivity to relevant reactor parameters, and method of implementation as well as other objects and features of the invention are described below in the detailed description of the invention.

DETAILED DESCRIPTION

Neutronic and Thermal Hydraulic Feedback

The BWR core consists of a large number of vertically oriented fuel bundles, exhibiting radially independent hydraulic behavior, that are coupled at their inlet and exit via the reactor upper and lower plenums. The fuel bundles are oriented in an array having the general shape of a right circular cylinder. Each fuel bundle has an open lattice of nuclear fuel pins enclosed by a flow channel through which water is pumped upwardly from the lower plenum to the upper plenum; the water functions both as a coolant and a neutron moderator. The presence of boiling within these fuel channels makes them susceptible to reactor coolant density-wave instabilities.

Pressure perturbations at the core inlet cause flow disturbances that travel up the fuel channels as time-varying coolant density waves. These waves result in local deviations from the steady-state axial pressure drop distribution. The local pressure drop in a fuel bundle is highly dependent on void fraction. Since the coolant voiding increases axially with greater core elevation, the highest void fraction is found at the channel outlet.

The effect of density waves on total channel pressure drop is therefore effectively delayed in time—the void sweeping time—until the perturbation is felt at the channel exit. When the channel pressure drop time delay (phase lag) nears 180° out of phase with the channel inlet flow variations, the fuel assembly can become thermal-hydraulically unstable. Thus the thermal-hydraulic stability margin of a fuel channel is dependent on the phase lag caused by void sweeping time, and the gain which is dependent on the channel void distribution.

An additional complexity is introduced in BWR stability because of the reactor power dependency on coolant density. Local void reactivity ($\rho_v$) responds to the time-varying density wave described above. The reactivity change affects local neutron flux ($\phi_{dv}$), and is manifested after a time delay (fuel thermal time constant) as changes in fuel cladding surface heat flux and ultimately in local coolant voiding. This mechanism can also provide positive feedback to density wave oscillations. The neutronic feedback gain is dependent on how closely the fuel thermal time constant approximates the void sweeping time, and on the local void fraction.

For point kinetics models, void reactivity is related to void fraction and local neutron flux by:

$$\Delta \rho_v \alpha \int_V \phi_{dv}^2 \times \left( \frac{d\rho}{dv} \right) \times \Delta v \times dV \quad (1)$$

The flux-squared dependency of reflects the feedback contribution of the relatively high power fuel bundles on core stability, which increases non-linearly with power.

Figure 1:
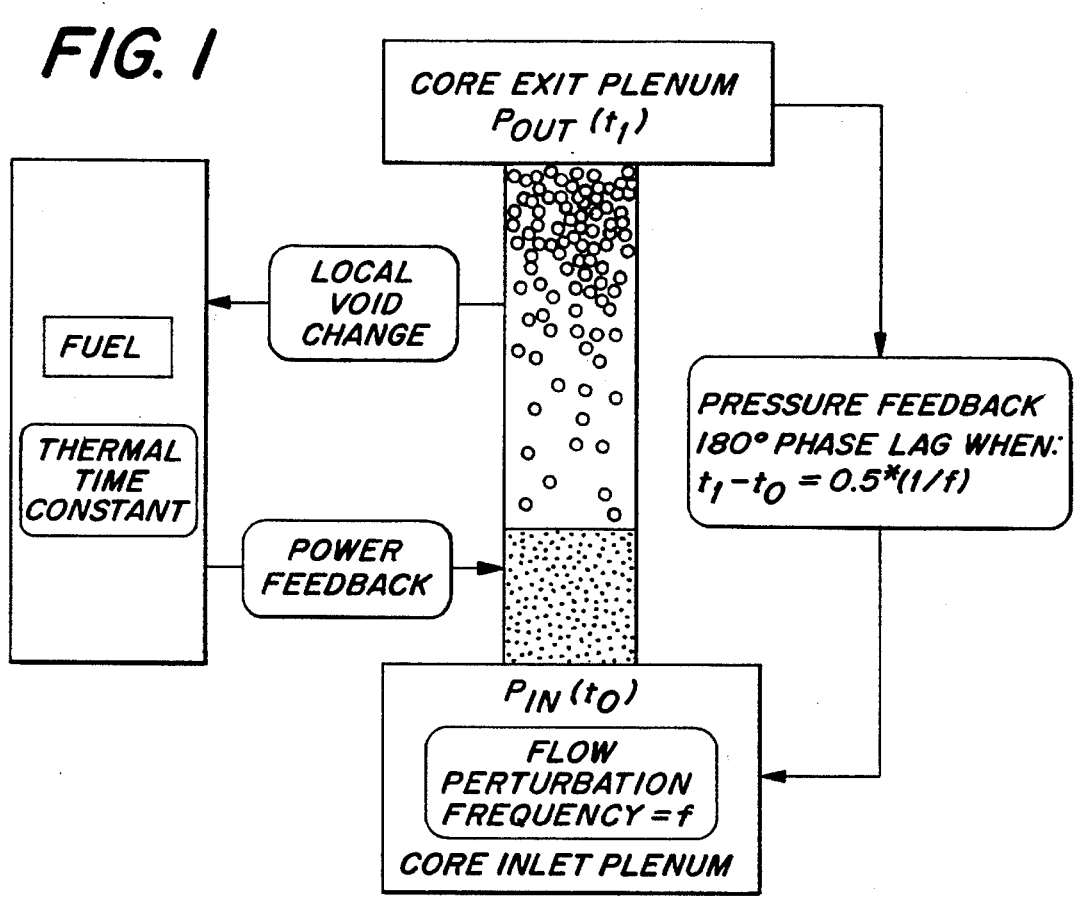
FIG. 1 is a schematic illustration of a reactor core showing neutronic and thermal-hydraulic feedback mechanisms.

The two feedback mechanisms, thermal hydraulic and neutronic, are coupled in a BWR core and produce oscillations in both core flow and thermal power. These oscillations can affect margins to fuel thermal safety limits. In addition, core instabilities can occur even when neither feedback mechanism alone is sufficient to generate reactor power oscillations. The feedback mechanisms described above are illustrated in FIG. 1.

Parameters Affecting Stability

Predicting and controlling reactor stability in an operational setting, where the fuel and core designs are fixed, is difficult. Commonly used operational parameters for measuring core thermal-hydraulic and neutronic behavior do not provide sufficient insight into the basic mechanics of reactor stability. Thus, a more fundamental approach is needed to permit development of a functional stability control.

Coupled neutronic-thermal hydraulic instability is a phenomenon only found in boiling water reactors. This is because only BWR's have significant bulk coolant boiling in the core during normal reactor operations. It is observed that BWR stability performance is dominated by the core void distribution for a given core design:

$$DR_{core} = f\{\text{void distribution}\}, \quad (2)$$

where $DR_{core}$ is the core decay ratio.

Figure 2:
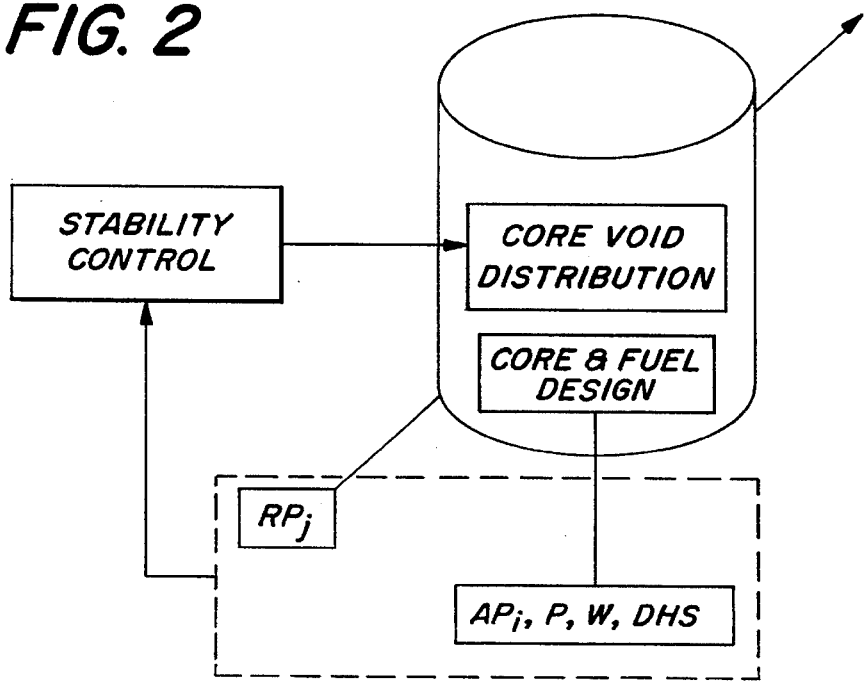
FIG. 2 is a schematic illustration of the paremeters affecting core stability.

When a BWR is maneuvered throughout its power-flow operating domain, five global variables can have a significant influence on void distribution: core flow, core power, axial flux shape, radial flux shape, and core coolant inlet subcooling. This relationship is illustrated in FIG. 2, in which $AP_i$: axial power shape
$RP_j$: radial power shape
P: core thermal power
W: core flow
DHS: core inlet subcooling $DR_{core}$, which is influenced by the core void distribution, is therefore related to the following variables:

$$DR_{core} = f\{AP_i, RP_j, P, W, DHS\} \quad (3)$$

Differentiating equation (3) yields:

$$d(DR_{core}) = \left( \frac{\partial DR_{core}}{\partial AP_i} \right) d(AP_i) + \left( \frac{\partial DR_{core}}{\partial RP_j} \right) d(RP_j) + \quad (4)$$

$$\left( \frac{\partial DR_{core}}{\partial P} \right) d(P) + \left( \frac{\partial DR_{core}}{\partial W} \right) d(W) + \left( \frac{\partial DR_{core}}{\partial DHS} \right) d(DHS)$$

The usefulness of equation (4) is severely limited, however. First, although the behavior of all terms except $$\left( \frac{\partial DR_{core}}{\partial AP_i} \right)$$

is generally understood, it is difficult to establish the partial derivatives for reasonable changes in the variables. This is due to the interdependency of these five parameters in an operational environment. During reactor startup, for example, the core radial power shape is constantly changing in response to control rod withdrawals executed to increase reactor power. This interdependence must be recognized in the development of a successful stability control.

Figure 3:
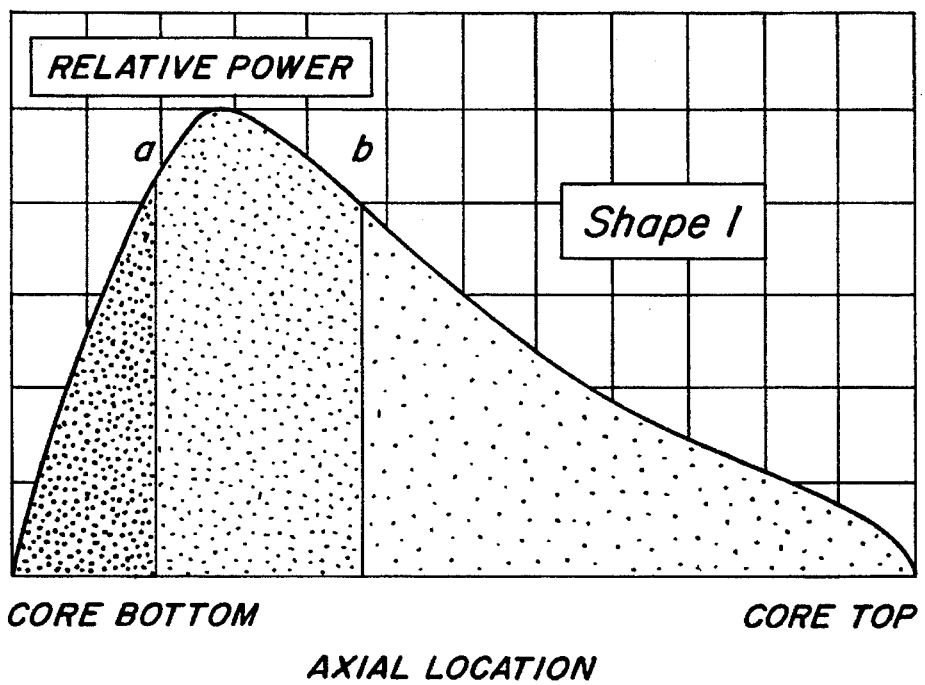
FIG. 3 is a graph illustrating a bottom peaked average axial core power distribution.
Figure 4:
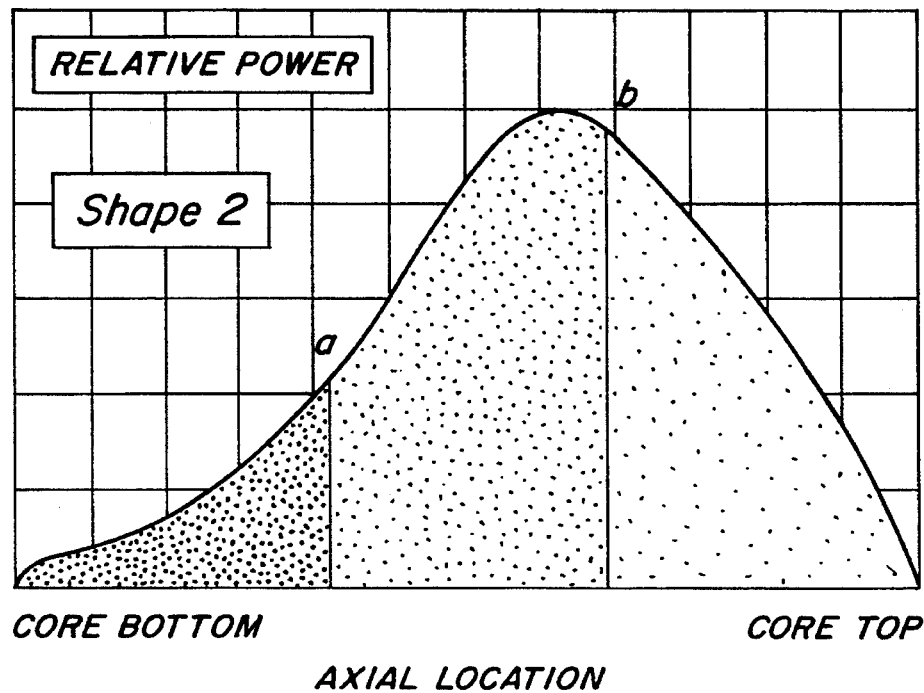
FIG. 4 is a graph illustrating a top peaked average axial core power distribution.

Second, no unique relationship between $AP_i$ and $DR_{core}$ and has been demonstrated. Analysis demonstrates that examination of the axial power shape alone cannot provide effective and reliable control of reactor stability. For example, consider the two cases depicted in FIGS. 3 (bottom peaked average axial power) and 4 (top peaked average axial power).

These figures show two hypothetical reactor states that differ only in their axial power shapes and core inlet subcooling ($RP_j$, P, and W remain constant). When core inlet subcooling (DHS) is low and bulk coolant saturates at elevation 'a', $DR_{Shape\ 1} < DR_{Shape\ 2}$. However, when core inlet subcooling is high and bulk coolant saturates at elevation 'b', then $DR_{Shape\ 1} > DR_{Shape\ 2}$. This example illustrates the difficulty of determining relative reactor stability margins based on changes in axial power shape alone.

The development of a simple, reliable stability control based on a direct independent assessment of each parameter in equation (3) therefore does not appear to be feasible. The variables are either interdependent, or their influence on $DR_{core}$ cannot be resolved. To proceed, the observation that the voided region of the core determines reactor stability, must be revisited.

Axial Power Shape Effects

Figure 5:
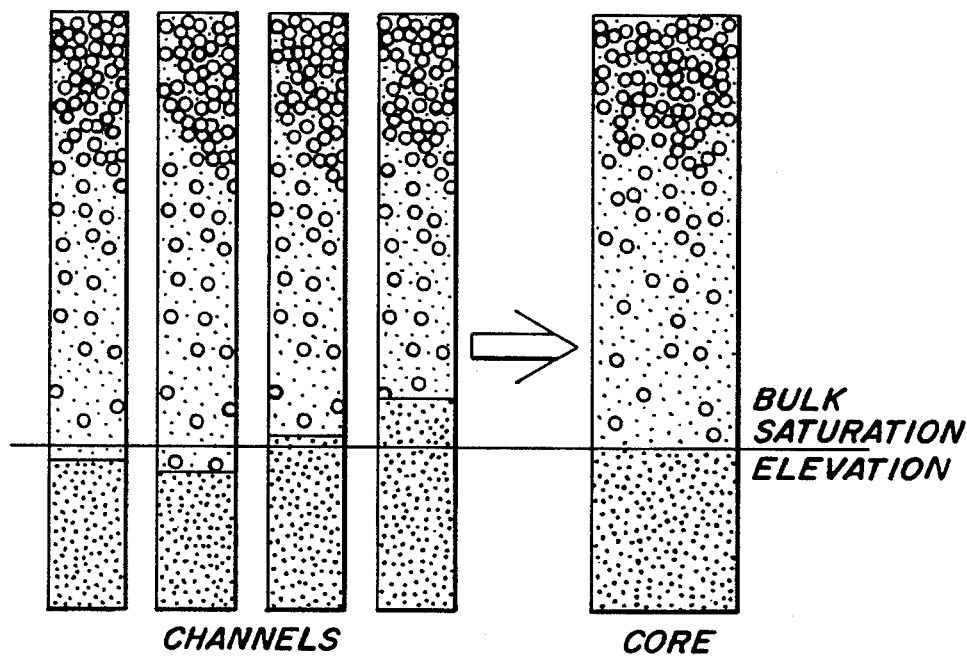
FIG. 5 is a schematic illustration showing how the multiple flow channels of a core may be modeled as a single "collapsed" core flow channel.

To simplify the discussion, a radial collapse of the core, as depicted in FIG. 5, will be initially assumed.

For an average fuel channel, equation (3) is simplified to:

$$DR_{core} = f\{AP_i, P, W, DHS\} \quad (5)$$

The presence of voids in the coolant flowing through the average channel divides the core into two distinct regions: the single-phase region below the bulk saturation elevation (1ø), and the two-phase region above the bulk saturation elevation (2ø). As a first order approximation, subcooled boiling is ignored.

Figure 6:
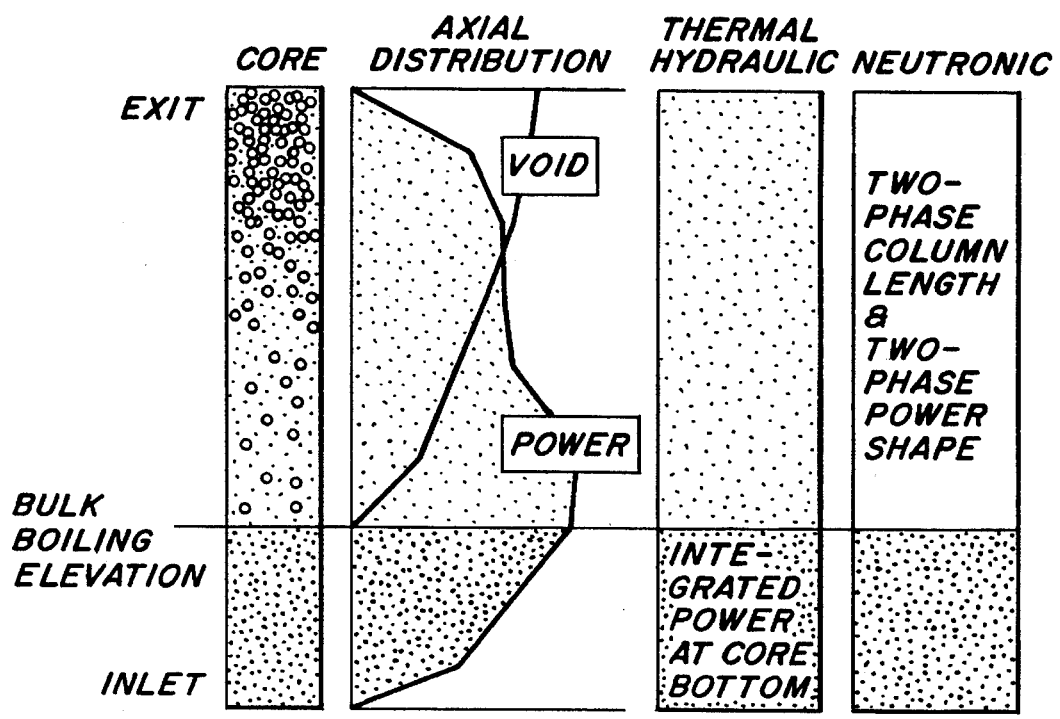
FIG. 6 is a set of graphs illustrating the axial variation of core stability feedback mechanisms.

These separated regions can be directly related to the feedback mechanisms driving reactor instability, described above. FIG. 6 illustrates the relationship between the separated regions of the core, and the stability feedback mechanisms.

The thermal hydraulic feedback is dependent on void sweeping time and core void fraction. Both of these parameters are dependent on the location of the bulk coolant saturation elevation (i.e. the elevation of the average boiling boundary). This elevation determines the two-phase column length which, for a given coolant flow rate (W), defines the void sweeping time and therefore pressure drop feedback phase lag. The location of the bulk coolant boiling boundary, in conjunction with the axial power shape in the two-phase region, also determines the core void fraction for a given reactor state condition (P, W, and DHS). The magnitude of the core void fraction helps determine the feedback gain. Thus, by resolving the location of the core average boiling boundary, the specific effects that the axial power shape has on reactor stability can be elicited.

The neutronic feedback is related to the core void fraction and the axial flux shape in the two-phase region ($AP_i^{2\phi}$). No significant neutronic feedback can occur in the single-phase region because moderator density variations are small. Again, knowledge of the bulk coolant saturation elevation is critical to evaluating this feedback mechanism. Since void reactivity is dependent on local flux squared (see Equation 1), $AP_i^{2\phi}$ can have a significant impact on stability margin if axial flux peaks high in the voided region of the core. These concepts, as illustrated in FIG. 6, lead to the observation that the two phase column length and neutron flux shape in the two-phase region of a reactor core are the major factors influencing reactor stability:

$$DR_{core} = f\left\{ \frac{L_{2\phi}}{L_{1\phi} + L_{2\phi}}, AP_i^{2\phi} \right\}, \quad (6)$$

where $L_{x\phi}$ is phase column length. The separation of the 1ø and 2ø regions of the core is dependent on identifying the average axial bulk coolant saturation elevation, $Z_{bb}$. On a core-average basis, this boiling boundary is a function of:

$$Z_{bb} = f\{AP_i, P, W, DHS\} \quad (7)$$

The issue of how $AP_i$ is related to $DR_{core}$ is now resolved. $AP_i$ has two distinct impacts on the stability feedback mechanisms. First, the integrated $AP_i$ at the core bottom determines the location of $Z_{bb}$ and thus the 2ø column length. Second, the $AP_i$ above $Z_{bb}$ influences the void reactivity feedback:

$$\rho_{84} = f\{AP_i, i > Z_{bb}\} \quad (8)$$

Without knowledge of the location of $Z_{bb}$ (which is not available independent of P, W, and DHS), the impact of axial power shape on each stability feedback mechanism is indeterminate.

The expression that relates core average boiling boundary, $Z_{bb}$, to the core average parameters important to stability is:

$$\sum_{i=1}^{Z_{bb}} AP_i = C \frac{W \times DHS}{P} \quad (9)$$

where C is a constant. (See Section on Implementation and Plant Experience for derivation of this equation.)

Variations in each parameter of Equation (9) result in an appropriate change in the core average boiling boundary as tabulated in Table 2.1.

TABLE 1

Limiting Changes in $Z_{bb}$

| Parameter Value | Boiling Height |
|---|---|
| $W \ll W_{nom}$ | $Z_{bb} \to 0$ |
| $W \gg W_{nom}$ | $Z_{bb} \to H_{core}$ |
| $P \ll P_{nom}$ | $Z_{bb} \to H_{core}$ |
| $P \gg P_{nom}$ | $Z_{bb} \to 0$ |
| $DHS \ll DHS_{nom}$ | $Z_{bb} \to 0$ |
| $DHS \gg DHS_{nom}$ | $Z_{bb} \to H_{core}$ |
| $AP_i$ = top peak | $Z_{bb} \to H_{core}$ |
| $AP_i$ = btm peak | $Z_{bb} \to 0$ | where:
$X_{nom}$ = nominal value
$H_{core}$ = core height

Radial Power Shape Effects

One variable that can significantly influence stability but is not captured within the $Z_{bb}$ expression, is the radial power shape, $RP_j$. This parameter was initially collapsed by performing a radial averaging of the fuel channels. In fact, the boiling boundary of each fuel assembly lies above or below the core average, depending on the assembly's relative thermal hydraulic condition (see FIG. 5). The hot channel boiling boundary, $Z_{bb}^{ch}$, is usually located below the core average because of its high power output. Therefore, the hot channel is expected to be thermal-hydraulically less stable than an average channel. To identify the parameters important in controlling hot channel stability, the fraction of core power, f, required for coolant saturation in an average channel can be written as follows:

$$f = \frac{DHS \times \frac{W}{N}}{\frac{P}{N}}, \quad (10)$$

where N is the number of fuel assemblies in the core.

Define $\bar{w}$ = average channel active flow, and $\bar{p}$ = average channel power, such that:

$$f = \frac{DHS \times \bar{w}}{\bar{p}}. \quad (11)$$

The fraction of power required for coolant saturation for the hot channel ($f_{ch}$) can be written as follows:

$$f_{ch} = \frac{DHS_{ch} \times w_{ch}}{P_{ch}} \quad (12)$$

Comparing the hot channel power fraction, $f_{ch}$, to the core average bundle power fraction, f, the following observations can be made:

$$DHS_{ch} = DHS,$$

$$P_{ch} = RP_j^{ch} \times \bar{p},$$

and $$W_{ch} \cong \overline{W}, \tag{13}$$

where $RP_j^{ch}$ is hot channel radial peaking.

The single most important factor relating the core average to the hot channel power fraction required for saturation is $RP_j^{ch}$, or:

$$f_{ch} \cong \frac{f}{RP_j^{ch}}. \tag{14}$$

As discussed above, the axial power shape also affects boiling boundary elevation. Hot channels are generally completely uncontrolled, and therefore the hot channel axial power shape, $RP_j^{ch}$, can be significantly more bottom peaked than the average channel. However, to a large extent, power sharing among adjacent fuel assemblies ameliorates these effects. Reducing the average power at the core bottom will limit the length of the hot channel two phase column length.

The influence of the high power fuel bundles on the stability of the entire reactor core can be disproportionally large, as has been noted. Therefore, an effective stability control must limit the hot channel decay ratio, $DR_{ch}$.

Identification of Stability Control

The capability to resolve the influence of core axial power shape on coupled neutronic-thermal hydraulic feedback mechanisms is achieved by dividing the axial flux into two components. These components are defined by the bulk coolant saturation elevation which provides the basis for a reliable, effective stability control.

If the core average boiling boundary, $Z_{bb}$, is maintained sufficiently high, then the core will remain stable ($DR_{core} \ll 1$) during normal reactor operations in regions susceptible to power oscillations.

When $Z_{bb}$ is sufficiently high, then variations in all parameters that affect stability will produce only second order effects on $DR_{core}$ and may be ignored if existing fuel thermal limits are not exceeded.

The foregoing permits the terms of equation 4 to be evaluated at $Z_{bb}$:

$$\nabla DR_{core}|_{Z^{bb}_{high}} = 0 \tag{15}$$

Reactor stability is assured with a high boiling boundary primarily because of the consequences of a short two-phase column on the thermal hydraulic and neutronic feedback mechanisms. The effect of variations in the two-phase axial power shape cannot render the core unstable at sufficiently high boiling boundaries. The $Z_{bb}$ concept also addresses the interdependence of the important parameters affecting stability. For a constant boiling boundary, a change in one stability parameter forces a compensating change in the others (see Equation 9).

Finally, a high boiling boundary limits the influence of radial power shape, $RP_j$ on stability. A significantly low integrated axial power in the core bottom is required to generate a high boiling boundary. Because of power sharing among fuel bundles, this low average power in the core bottom limits the hot channel two-phase column length and therefore maintains its relative stability. Unusual control rod configurations that support sufficient power sharing among a group of adjacent high power bundles could potentially threaten core stability, even at high core average boiling boundaries. However, this situation, where a highly skewed power shape exists, is not compatible with maintenance of existing fuel thermal limits while operating with the stability control in place.

DERIVATION OF STABILITY CONTROL LIMIT

A stability control limit is only useful operationally if adherence to the limit can be determined using currently defined core parameters, and can be accomplished during necessary reactor maneuvers. The $Z_{bb}$ stability control, which only utilizes core average parameters and obviates the need for radial constraints, will be employed to define the stability limit.

Assuming that 100% of core power is deposited in the active fuel channel flow (conservative, since actual value is approximately 98%), the fraction of core power (f) required for coolant saturation is:

$$f = F_{af} \frac{W \times DHS}{P} \tag{16}$$

where:

$F_{af}$=Active core flow fraction at off-rated conditions

W=core flow rate

DHS=core inlet subcooling

P=total core thermal power or following unit conversion:

$$f = \frac{0.293 \times F_{af} \times W \times DHS}{P}, \tag{17}$$

where:

W in ($10^6$ $lb_m$/hr)

DHS in (BTU/lb)

P in ($MW_{th}$)

The core axial plane where this fraction of core power occurs is dependent upon the average axial power shape. For a core divided into n axial nodes, generating a relative nodal axial power $AP_i$, the axial power distribution is assumed to be normalized as follows:

$$\frac{1}{n} \sum_{i=1}^{n} AP_i = 1.0. \tag{18}$$

The axial elevation where the integral of the average axial power (from the bottom of the fuel) equals f defines the core average bulk coolant boiling boundary ($Z_{bb}$):

$$\frac{1}{n} \sum_{i=1}^{Z_{bb}} AP_i = 0.293 \frac{F_{af} \times W \times DHS}{P} \tag{19}$$

Figure 7:
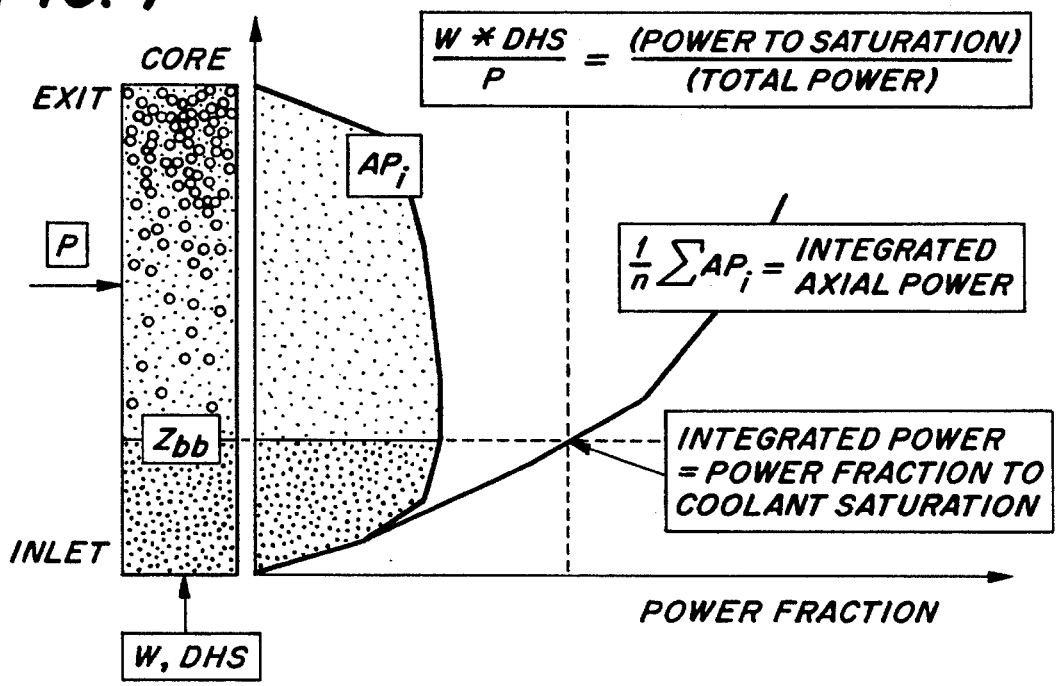
FIG. 7 is a graph illustrating the relationship of the core average boiling boundary to core average parameters that are important to stability.

The relationship of the core average boiling boundary to all core average parameters that are important to stability, is illustrated in FIG. 7.

To control the core average boiling boundary during reactor operations, the boiling boundary ($Z_{bb}$) can be compared to a predetermined minimum elevation limit, ($\overline{Z}_{bb}$). This boiling boundary stability control is enforced by requiring the actual boiling boundary ($Z_{bb}$) to exceed the limit, $\overline{Z}_{bb}$:

$$Z_{bb} \geq \overline{Z}_{bb}. \tag{20}$$

This expression is now converted from an elevation limit into a core power fraction limit. Specifically, the core power fraction up to the boiling boundary limit, $\overline{Z}_{bb}$, must be less than the power fraction required for bulk coolant saturation:

$$\frac{1}{n} \sum_{i=1}^{\overline{Z}_{bb}} AP_i \leq 0.293 \frac{F_{af} \times W \times DHS}{P}. \tag{21}$$

Thus, the power required for coolant saturation must be larger than the actual power generated up to elevation $\overline{Z}_{bb}$ and therefore the boiling boundary will occur, on a core average basis, above $\overline{Z}_{bb}$.

The stability control is now normalized, by defining a limit of Fraction of Core Boiling Boundary (FCBB) as follows:

$$FCBB = \frac{\frac{1}{n}\sum_{i=1}^{\bar{Z}_{bb}} AP_i}{0.293 \frac{F_{af} \times W \times DHS}{P}} \quad (22)$$

This normalized limit should satisfy the condition:

$$FCBB \leq 1.0 \quad (23)$$

Adherence to the FCBB limit ensures that the actual core average boiling boundary, $Z_{bb}$, is equal to or higher than $\bar{Z}_{bb}$.

Use of the boiling boundary concept provides a powerful mechanism for operational control of reactor stability. Its strength is derived from two significant features. First, the control explicitly incorporates all reactor parameters that have a significant influence on stability. This means that the stability control can be reliably and effectively used by itself, without concern for changes in other parameters. Second, the stability control is readily derived from core average parameters normally available to a reactor operator. In fact, the normalized stability control limit, FCBB, can easily be incorporated into core monitoring computer software for automatic display to reactor operators.

Figure 8:
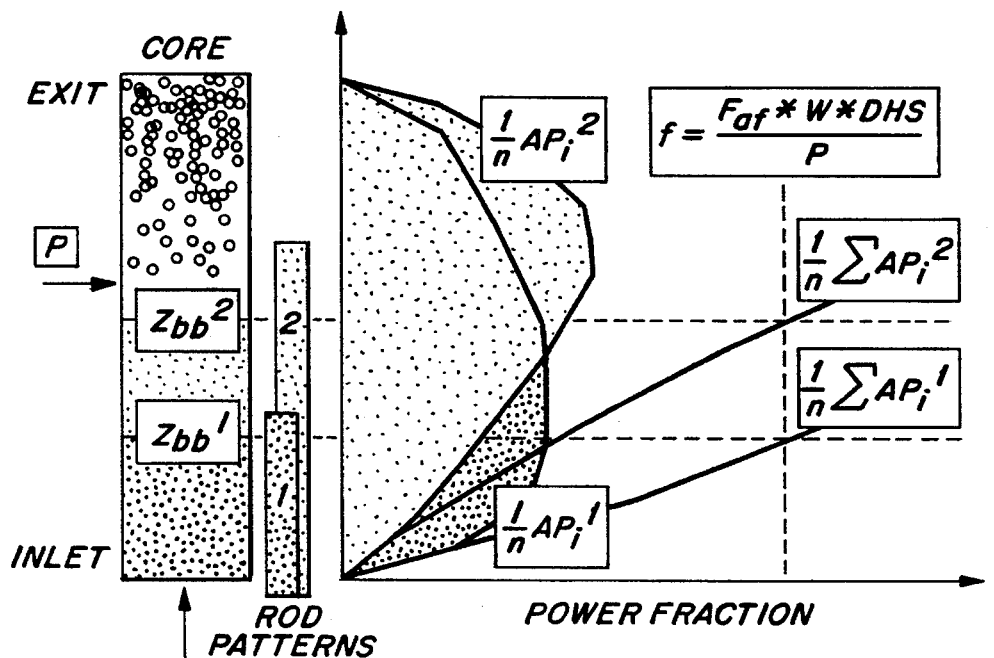
FIG. 8 is a graph illustrating a change in core average boiling boundary which may occur upon repositioning of the control rods.

These two features permit quick and efficient evaluation of core stability during reactor maneuvering. For example, the change in $Z_{bb}$, caused by the repositioning of control rods, is reflected in FIG. 8.

Control rod pattern 1 represents a bottom peaked power shape with an associated boiling boundary $Z_{bb}1$ that is assumed to cause FCBB>1.0. To rectify this situation, control rod pattern 2 is adopted. This change raises the boiling boundary to $Z_{bb}2$ where $Z_{bb}1 > Z_{bb}2$, in order that FCBB<1.0. The effect of raising the boiling boundary is a shortened two-phase column length, which improves the reactor stability margin as outlined in above.

IMPLEMENTATION AND PLANT EXPERIENCE

Background

Figure 9:
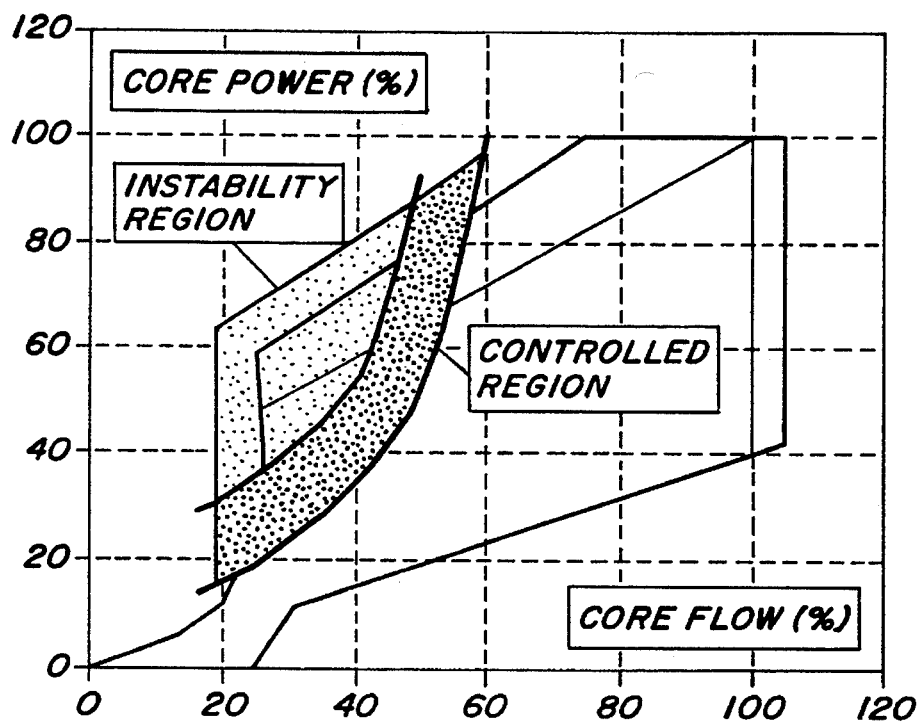
FIG. 9 is a graph of core power versus core flow illustrating various operating regions.

A typical core power and flow operating map for a reactor is shown in FIG. 9. The lightly shaded area in the figure labelled "instability region" is representative of the operating domain region susceptible to power oscillations. Its shape is consistent with the influence of core power and flow on reactor stability.

A generic calculational procedure, described in BWR Owners Group, *Long Term Stability Solutions Licensing Methodology*, GE Nuclear Energy Licensing Topical Report NEDO-31960, June 1991, has been selected for establishing the boundary of the region susceptible to power oscillations. Alternative methods of accounting for the different modes of oscillation may be used. The procedure uses a stability criterion that accounts for susceptibility to the fundamental and higher order harmonic modes of power oscillations, based on calculated values for core and hot channel decay ratios.

Implementation

The stability control, Fraction of Core Boiling Boundary (FCBB), Significantly increases the margin to reactor instability near the operating region susceptible to power oscillations. In general, it is assumed that the instability region shown in FIG. 9 will be avoided during controlled reactor maneuvers in order to decrease the possibility of reactor power oscillations.

The presence of conditions conducive to power oscillations outside this region is, however, still possible. Examples of such conditions include low feedwater temperature, unfavorable xenon conditions and skewed axial and radial flux distributions. Application of the stability control, FCBB, in a defined area outside the region susceptible to power oscillations provides protection not only during normal operation, but also under extreme operating conditions.

In addition, the use of FCBB outside the region susceptible to instabilities addresses the problem of uncertainty in the location of this region boundary. Resolution of this issue is possible since conformance to FCBB provides significant stability margin. In effect, state points at the boundary of the susceptible region that satisfy the FCBB limit will result in reactor conditions well within the stability criterion.

An operating domain region is defined to be outside the region susceptible to instabilities where FCBB is applied. An example of this controlled region is shown in FIG. 9. The size of the controlled region can be determined by requiring that reasonably limiting reactor conditions at the controlled region boundary, with no stability controls enforced, will conform to the stability criterion.

The target elevation of the core average boiling boundary, $\bar{Z}_{bb}$, is used to define the operating limit, FCBB (see Equation 22). The FCBB limit is normalized such that conformance to $\bar{Z}_{bb}$ during controlled reactor maneuvers is ensured if FCBB does not exceed 1.0. As an example, for a core model consisting of 25 nodes, each 6.0 inches high, and with $\bar{Z}_{bb}$=4.0 feet, FCBB requires:

$$\frac{(AP_1 + AP_2 + \ldots + AP_8)/25}{0.293 \times F_{af} \times W \times DHS/P} \leq 1.0, \quad (24)$$

where $$\sum_{i=1}^{25} AP_i = 25,$$

$W$ in $10^6$ lb$_m$/hr, $DHS$ in BTU/lb$_m$, and $P$ in MW$_{th}$.

If during controlled reactor operations FCBB exceeds 1.0, the boiling boundary is below $\bar{Z}_{bb}$ and corrective action is needed. The most effective way to decrease FCBB is by insertion of shaping control rods. These rods will suppress the power at the bottom of the core and shift the boiling boundary upward (See FIG. 8).

The FCBB limit in conjunction with other fuel operating limits provides adequate protection from reactor instabilities. However, as a matter of good operating practice, non-uniform control rod patterns should be avoided. This includes control rods in deep position for reactivity control, as well as shallow position for $Z_{bb}$ control. Control rod dispersion that is radially non-uniform may lead to situations where small regions in the core become neutronically decoupled, exhibiting a low $Z_{bb}$ and potentially reducing the stability margin of the reactor.

Inserting control rods used for reactivity control as far as possible into the core can also increase the stability margin of the reactor. This insertion minimizes the power generated at the core top, which weakens the neutronic feedback.

In summary, control rod distribution patterns that are radially uniform in the core should be used for both the shaping and the reactivity control rods. The shaping control rod inventory should be set to achieve the target $\overline{Z}_{bb}$. The reactivity control rod inventory should be set to minimize the power peaking in the core top. Placing control rods at other intermediate positions should be avoided to the extent practicable.

As the reactor startup is initiated, $Z_{bb}$ is at the top of the core, where bulk saturation is first achieved. Subsequently, $Z_{bb}$ is moved downward in the core as control rods are being withdrawn and reactor power increases. As the rated operating condition is approached, the bulk saturation elevation in the core is lowered and $Z_{bb}$ settles below $\overline{Z}_{bb}$. Reactor instability is not a concern, however, because of the high core flow rate.

For some reactor designs, the controlled region of FIG. 9 can be completely avoided, and application of stability controls is not required. However, if entry into the controlled region is unavoidable, FCBB, and therefore $\overline{Z}_{bb}$, can be enforced to preclude instabilities. Since $Z_{bb}$ is initially very high in the core, the startup path can be planned such that $Z_{bb}$ will not fall below $\overline{Z}_{bb}$ prior to maneuvering through the controlled region. This strategy will eliminate unnecessary and untimely control rod maneuvers to satisfy the FCBB limit. Upon exiting the controlled region, the shaping control rods can be withdrawn to achieve the target rod pattern for rated conditions, allowing $Z_{bb}$ to fall below $\overline{Z}_{bb}$.

Plant Experience

The core average boiling boundary control's effects on reactor stability performance has been assessed for reactor conditions and with control rod patterns consistent with normal operational practices. The results of this assessment suggest that a core average boiling boundary limit of about 4.0 feet (about one-third of the typical core height of about 12 feet) is not only an effective control, but that it is also feasible. This conclusion is supported by actual plant data.

Startup data from a US BWR plant was evaluated to assess the implementation feasibility of a $\overline{Z}_{bb}$ limit of 4.0 feet. The data was selected at the most challenging core power and flow state point along the startup path. This state point is achieved during a required reactor recirculation pump upshift from slow to high speed at minimum core flow conditions. A summary of selected actual conditions from one operating cycle is provided in Table 2.

TABLE 2

| | Exposure (GWD/MT) | Shut down (days) | Secondary Rods | $Z_{bb}$ (ft) |
|---|---|---|---|---|
| 1. | 0.1 | >14 | used | 4.3 |
| 2. | 1.4 | <1 | none | 2.9 |
| 3. | 2.0 | >9 | none | 2.5 |
| 4. | 5.4 | >1 | used | 4.9 |

The table represents operating state points with different xenon conditions (shutdown duration prior to startup), cycle exposures and control rod patterns. The secondary control rods remain inserted early in the startup and are typically withdrawn prior to achieving the final rod pattern at rated power. The purpose of the secondary rods is power shaping during the startup to compensate for non-equilibrium xenon conditions. They may be withdrawn before or after the recirculation pump upshift. As expected, the $Z_{bb}$ values in Table 1 are directly related to the use of the shaping secondary rods. No correlation is observed (or expected) in relation to xenon condition or cycle exposure.

The operating conditions shown in Table 2 were specified without any consideration of $Z_{bb}$. They represent typical operating conditions for the fuel cycle. Moreover, additional analysis based on actual reactor operating conditions demonstrated that $Z_{bb}$ values of 5.0 feet, at varying cycle conditions from beginning to end of cycle, are achievable. Thus, a $\overline{Z}_{bb}$ limit of 4.0 feet can be operationally consistent with typical plant operations near the region susceptible to reactor instability.

Figure 10:
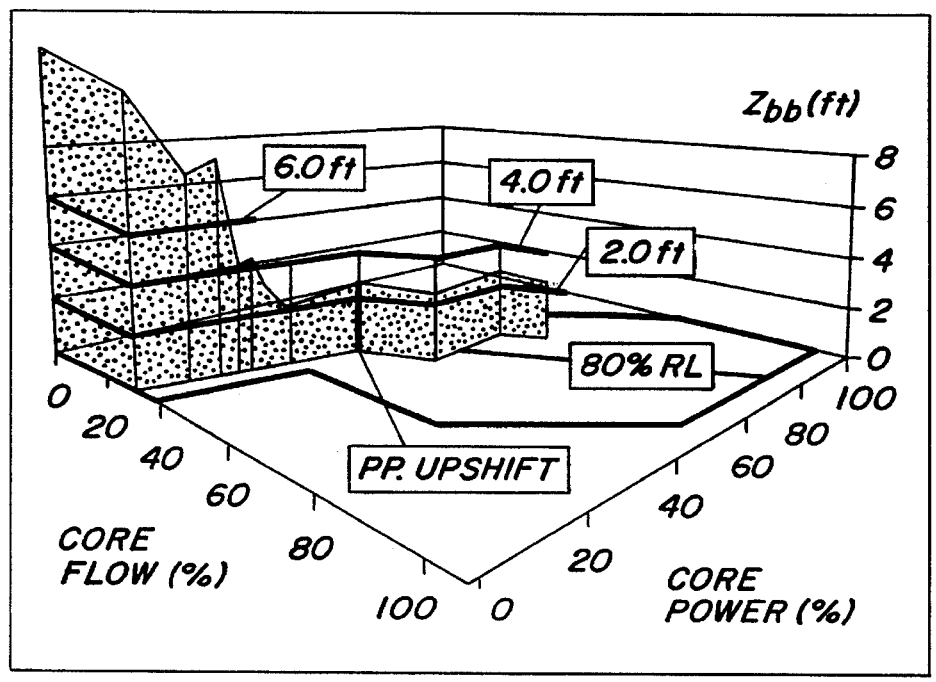
FIG. 10 is a graph of core average boiling boundary versus core flow and core power for one reactor startup path.

Details of State Points 1 and 3 in Table 1 are provided to demonstrate the difference between low and high $Z_{bb}$ startups. FIG. 10 depicts the core average boiling boundary, $Z_{bb}$, of State Point 3 as a function of the actual startup path. The operating map is shown as a reference on the core power and flow plane.

Figures 11, 12:
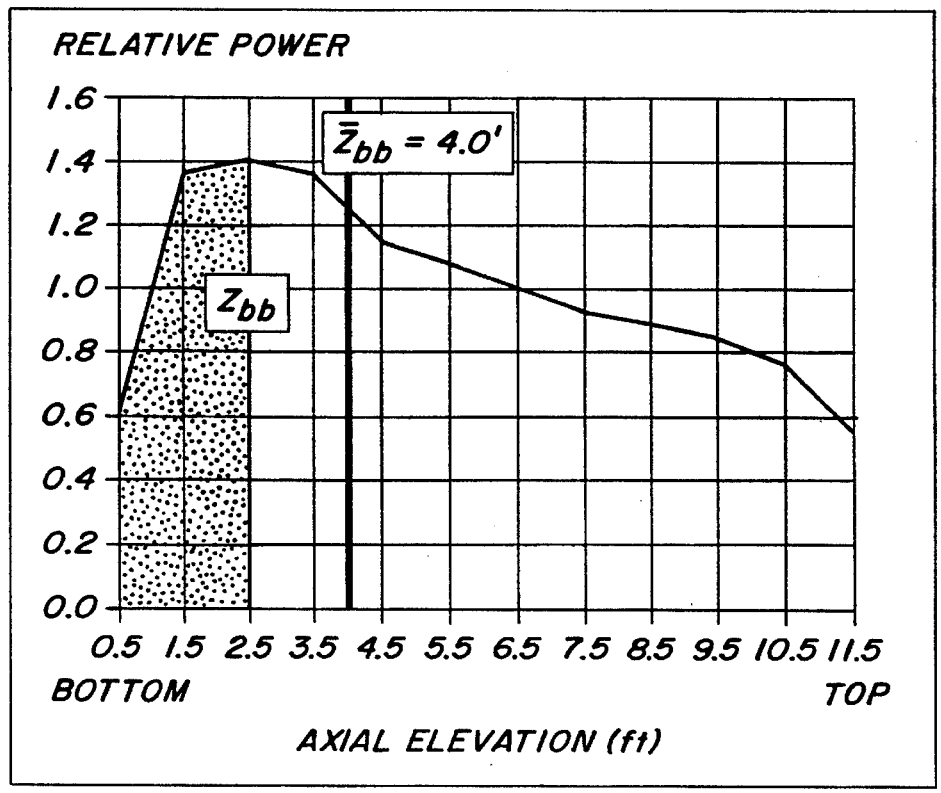
FIG. 11 illustrates the control rod pattern associated with the startup path of FIG. 10.
FIG. 12 is a graph of relative average axial power versus axial core elevation for the startup path of FIG. 10.

As expected, $Z_{bb}$ starts high in the core when power is low, and decreases to about 2.0 feet when the 100% recirculation flow control-line is reached. The secondary control rods are withdrawn early in the startup path, which results in a $Z_{bb}$ of 2.5 feet at the recirculation pump upshift conditions. The corresponding control rod pattern, with quarter-core symmetry, is shown in FIG. 11. The axial power shape, with the actual indicated, is shown in FIG. 12. In this case $Z_{bb}$ is below the target $\overline{Z}_{bb}$ limit of 4.0 feet.

Figure 13:
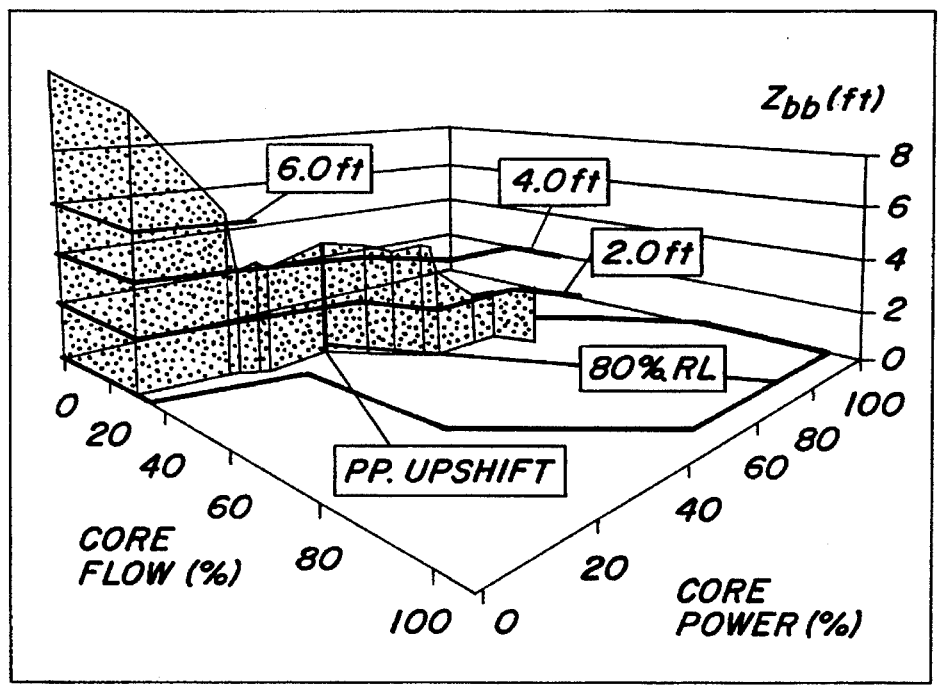
FIG. 13 is a graph of core average boiling boundary versus core flow and core power for another reactor startup path.

In contrast, FIG. 13 depicts the core average boiling boundary, $Z_{bb}$, of State Point 1 as a function of the actual startup path. Here, the secondary rods are withdrawn late in the startup path. This results in a $Z_{bb}$ value over 4.0 feet at the recirculation pump upshift conditions.

Figure 14:
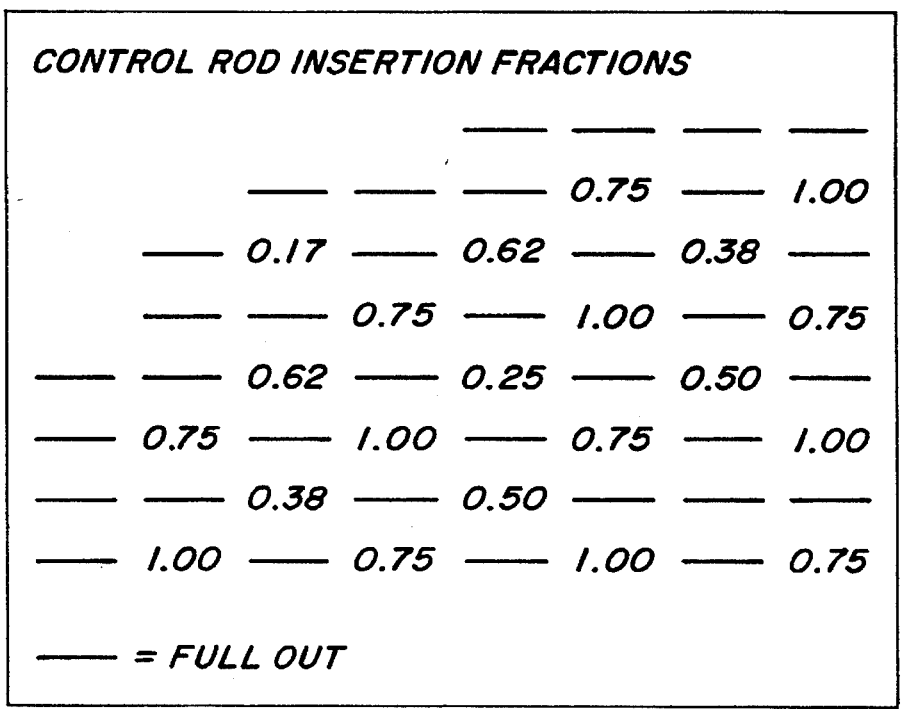
FIG. 14 illustrates the control rod pattern associated with the startup path of FIG. 13.
Figure 15:
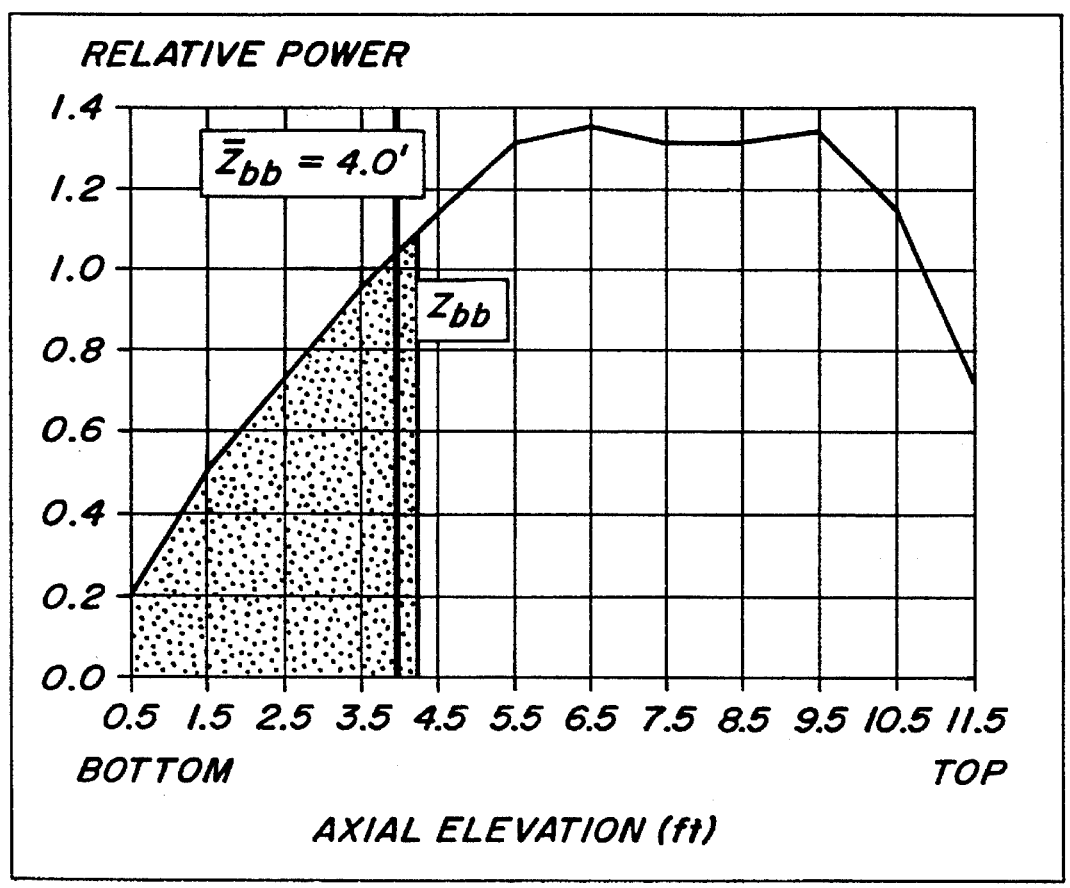
FIG. 15 is a graph of relative average axial power versus axial core elevation for the startup path of FIG. 13.

The control rod pattern is shown in FIG. 14 and the axial power shape in FIG. 15. In this case $Z_{bb}$ is above the target $\overline{Z}_{bb}$ limit of 4.0 feet.

The FCBB limit, with $\overline{Z}_{bb}$ set at 4.0 feet, has been implemented successfully in an operating US BWR. Implementation of the FCBB limit did not result in any significant additional burden to the operating staff. It has created and maintained significant stability margin throughout the reactor startup path, without any need for reliance on a stability monitoring system, on-line instability predictions, or pre-startup analysis.

Industry experience has clearly demonstrated the need for an effective stability control that can readily be applied to reactor operations. The core average boiling boundary control fulfills this need.

BWR stability performance is dominated by the core void distribution. All global core parameters must be considered in defining the location of the bulk coolant saturation elevation that marks the beginning of the voided core region. However, the two-phase column length and neutron flux shape in the two-phase region of a core are the major factors influencing reactor stability. The two-phase column length determines the void sweeping time and therefore the pressure drop phase lag. It also limits the core void fraction that controls the thermal hydraulic and neutronic feedback gains.

The core average boiling boundary provides a convenient parameter for expressing the relative lengths of the single-phase and two-phase columns in a reactor core. When defined using core average parameters, the equation incorporates all the factors important to reactor stability for a radially collapsed core. The effects of varying radial core power shapes can be controlled through use of the boiling boundary parameter in conjunction with existing fuel thermal limits.

When the core average boiling boundary is raised sufficiently, the core remains very stable during reactor maneuvering in a defined power-flow operating domain region. In addition, variations in all parameters affecting stability become secondary and may be ignored.

Thus, a single parameter stability control has been developed that captures all significant factors affecting reactor stability. Use of this control can guide plant operations in a practical manner, to assure adequate stability margins during reactor maneuvering. The ability to utilize this stability control has been demonstrated analytically, and verified during reactor startups with a large BWR.

Figure 16:
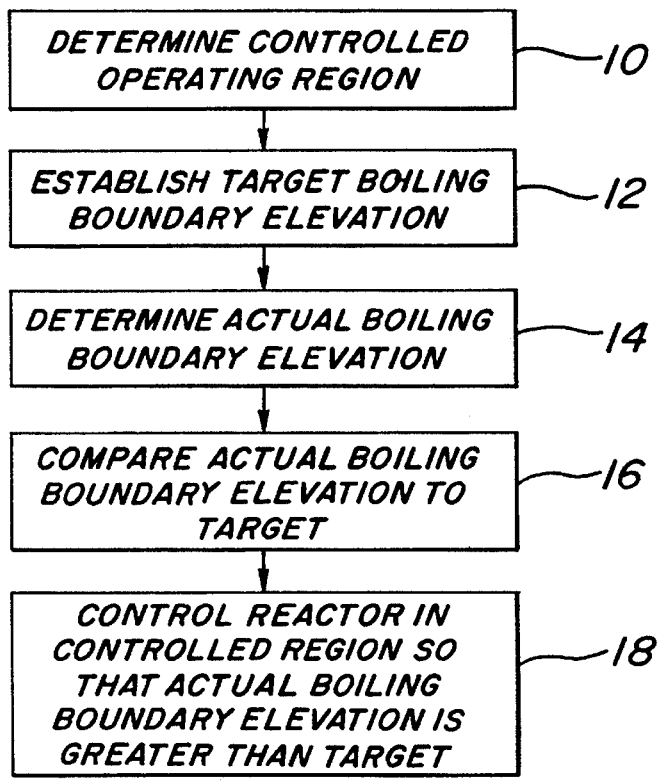
FIG. 16 is a flow diagram illustrating the method of the present invention.

In accordance with the foregoing, the flow diagram of FIG. 16 illustrates the method of the invention. In step 10, a region in core power—core flow space is determined, in which the control method is to be implemented. This control region is preferably adjacent a predetermined instability region, as illustrated in FIG. 9. In step 12, a target value of core elevation is determined. In step 14, the actual average boiling boundary elevation in the core is determined. In step 16, the actual average boiling boundary elevation is compared with the target value. In the preferred embodiment, step 16 is carried out by computing the power generated in the core below the target elevation, the power required for coolant saturation, and forming their ratio FCBB. In step 18, the reactor (if it is in the control region determined in step 10) is controlled so that the actual average boiling boundary elevation is greater than the target elevation; with the preferred embodiment for step 16, the controlling 18 is performed so that FCBB is equal to or less than one. The controlling step 18 may be implemented by positioning shaping control rods. Steps 14, 16, and 18 are preferably performed repetitively in a control loop to maintain stability.

Figure 17:
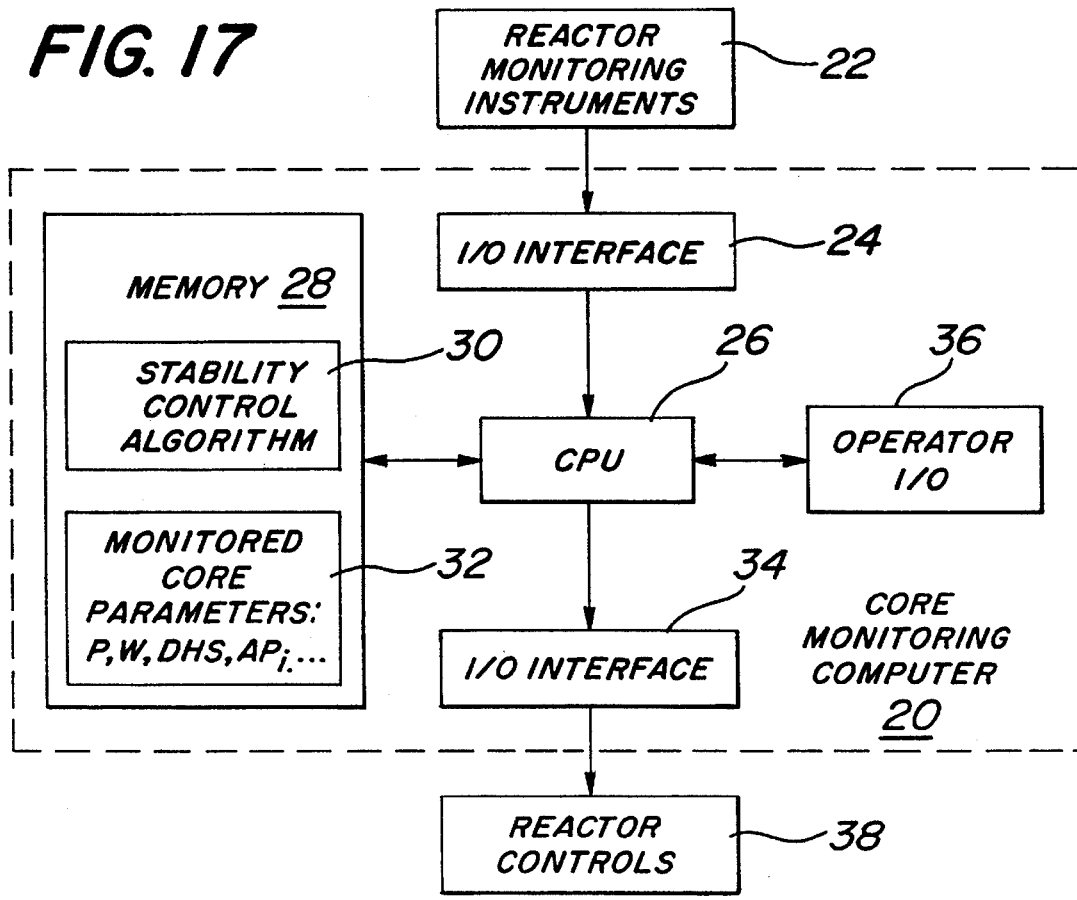
FIG. 17 is a block diagram of apparatus suitable for carrying out the present invention.

The block diagram of FIG. 17 illustrates a preferred apparatus for carrying out the invention, which merely requires modification of the software in a core monitoring computer already used with the reactor. The core monitoring computer 20 receives signals from core monitoring instruments 22 via I/O interface 24. Digital data 32 representing these signals and parameters derived therefrom are stored in memory 28 under control of CPU 26. Memory 28 also includes a stability control algorithm 30 in accordance with the invention, such as an algorithm for calculating FCBB. The algorithm 30 is executed by CPU 26 using the monitored core parameters 32 stored in memory 28. Core monitoring computer 20 includes an operator I/O 36 coupled to CPU 26, which may comprise a keyboard and a visual display. Algorithm 30 may include portions for controlling a display, such as to display the actual and target boiling boundary elevations or to display FCBB. CPU 26 is coupled to reactor controls 38, such as means for positioning control rods, via I/O interface 34. Algorithm 30 may include means for automatically operating the reactor controls to maintain the stability control conditions described herein. Alternatively, the apparatus may merely output information to the operator regarding stability conditions, and the operator may independently determine and effect appropriate reactor control.

While a preferred embodiment of the invention has been disclosed, variations will no doubt occur to those skilled in the art without departing from the spirit and scope of the invention.

What is claimed is:

1. A method of operational control of the stability of a boiling water nuclear reactor, said reactor having a core comprising vertically oriented fuel bundles in a generally right circular cylindrical array, each fuel bundle having an open lattice of nuclear fuel pins enclosed by a flow channel through which coolant water flows upwardly and is heated by thermal power generated by said fuel pins, said core having on a core average basis a boiling boundary between an upper coolant phase in which boiling occurs and a lower coolant phase in which boiling does not occur, said method comprising the steps of:

a. establishing a target value of elevation in the reactor core of the average coolant boiling boundary;

b. determining the actual elevation in the reactor core of the average coolant boiling boundary;

c. comparing said actual coolant boiling boundary elevation to said target value; and d. controlling said actual coolant boiling boundary elevation to be greater than said target value, said controlling step being performed in a controlled region in core power-core flow space comprising a predetermined operating region of core power and core flow.

2. The method of claim 1, wherein said controlling step is performed in a controlled region adjacent an instability region which comprises a predetermined operating region susceptible to power oscillations.

3. The method of claim 2, wherein said reactor has a rated core flow and core power, and said controlling step is performed in a controlled region which lies between about 20% and about 60% of rated core flow, and between about 20% and 90% of rated core power.

4. The method of claim 2, further comprising the step of controlling said core power and core flow to be outside said instability region.

5. The method of claim 1 wherein said establishing step includes establishing said target value at about one third of the height of said core.

6. The method of claim 1, wherein said establishing step includes establishing said target value at about four feet.

7. The method of claim 1, wherein said controlling step includes positioning of shaping control rods in said core.

8. The method of claim 7, wherein said controlling step includes positioning of shaping control rods in said core so as to provide an average axial power distribution in said core which peaks at a relatively high core elevation.

9. The method of claim 1, wherein said comparing step includes comparing the power generated by said core in the axial region below said target value with the power required for coolant water saturation.

10. The method of claim 9, wherein said comparing step includes determining the ratio of the power generated by said core in the axial region below said target value to the power required for coolant water saturation, and said controlling step includes controlling the operation of the reactor so that said ratio is equal to or less than one.

11. Apparatus for use in controlling the operation of a boiling water nuclear reactor to avoid reactor core power oscillations, said reactor having a power generating core through which coolant water flows upwardly, said coolant having on a core average basis an average boiling boundary between an upper phase in which boiling occurs and a lower phase in which boiling does not occur, comprising:

means for determining the average elevation in the core of the boiling boundary;

means for comparing said average core boiling boundary elevation with a target value of core elevation; and means for controlling the operation of said reactor so as to maintain said average core boiling boundary elevation greater than said target elevation value.

12. The apparatus of claim 11, wherein said target elevation value is about four feet.

13. The apparatus of claim 11, wherein said target elevation value is about one-third of the height of said core.

14. The apparatus of claim 11, wherein said means for determining said average core boiling boundary elevation includes means for determining the power generated by said core below said target elevation.

15. The apparatus of claim 14, wherein said comparing means includes means for comparing the power generated by said core below said target elevation value with the power required for saturation of said coolant water.

16. The apparatus of claim 15, wherein said comparing means includes means for determining the ratio of the power generated by said core below said target elevation value to the power required for saturation of said coolant water.

17. The apparatus of claim 11, further including means coupled to said comparing means for displaying the comparison of said average boiling boundary elevation with said target elevation value.

18. The apparatus of claim 11, wherein said apparatus comprises a core monitoring computer.

* * * * *